United States Patent
Kondo

(10) Patent No.: US 7,093,078 B2
(45) Date of Patent: Aug. 15, 2006

(54) DATA ACCESS METHOD IN THE NETWORK SYSTEM AND THE NETWORK SYSTEM

(75) Inventor: Hidetoshi Kondo, Yamanashi (JP)

(73) Assignee: NEC Corporation, Tokyo (JP)

( * ) Notice: Subject to any disclaimer, the term of this patent is extended or adjusted under 35 U.S.C. 154(b) by 892 days.

(21) Appl. No.: 09/731,773

(22) Filed: Dec. 8, 2000

(65) Prior Publication Data

US 2001/0003839 A1   Jun. 14, 2001

(30) Foreign Application Priority Data

Dec. 9, 1999   (JP) ............................. 11-349809

(51) Int. Cl.
*G06F 12/00* (2006.01)

(52) U.S. Cl. ................. 711/141; 711/148; 711/150; 709/213

(58) Field of Classification Search ............. 711/137, 711/168, 145, 141, 148, 150; 709/213, 214, 709/216, 215, 253
See application file for complete search history.

(56) References Cited

U.S. PATENT DOCUMENTS

| | | | |
|---|---|---|---|
| 5,737,757 A * | 4/1998 | Hassoun et al. ............. 711/145 |
| 5,829,032 A | 10/1998 | Komuro et al. |
| 5,881,303 A * | 3/1999 | Hagersten et al. ............ 712/30 |
| 5,987,579 A | 11/1999 | Nishtala et al. |
| 6,014,690 A * | 1/2000 | VanDoren et al. ........... 709/215 |
| 6,065,077 A * | 5/2000 | Fu .............................. 710/100 |
| 6,067,603 A * | 5/2000 | Carpenter et al. ............ 711/141 |
| 6,085,293 A * | 7/2000 | Carpenter et al. ............ 711/141 |
| 6,192,452 B1 * | 2/2001 | Bannister et al. ............ 711/141 |
| 6,209,065 B1 * | 3/2001 | Van Doren et al. .......... 711/150 |
| 6,253,292 B1 * | 6/2001 | Jhang et al. ................. 711/146 |
| 6,292,705 B1 * | 9/2001 | Wang et al. .................... 700/5 |
| 6,338,122 B1 * | 1/2002 | Baumgartner et al. ....... 711/141 |
| 6,505,318 B1 * | 1/2003 | Quach et al. ................ 714/746 |
| 6,546,429 B1 * | 4/2003 | Baumgartner et al. ....... 709/253 |
| 6,591,348 B1 * | 7/2003 | Deshpande et al. .......... 711/141 |

FOREIGN PATENT DOCUMENTS

| | | |
|---|---|---|
| JP | 59-96585 | 6/1984 |
| JP | 60-200351 | 10/1985 |

(Continued)

OTHER PUBLICATIONS

Fredrick Dahlgren, Michel Dubois, and Per Stenstrom, "Combined Performance Gains of Simple Cache Protocol Extensions," Computer Architecture News, vol. 22, No. 2, pp. 187-197, Apr. 1994.

*Primary Examiner*—Jungwon Chang
(74) *Attorney, Agent, or Firm*—McGinn IP Law Group, PLLC

(57) ABSTRACT

According to this data access method to be used in a network system, while the tag information is read out from the tag memory, the data is speculatively read out from the memory unit in the self node device. When the read out tag information shows that the speculatively read out data is not found in any of the cache memories, such speculatively read out data is sent to the processor in the self node device. When the read out tag information shows that the speculatively read out data is found in one of the cache memories, the data existing in such cache memory is acquired and sent to the processor in the self node device and the speculatively readout data is abolished.

16 Claims, 14 Drawing Sheets

FOREIGN PATENT DOCUMENTS

| | | |
|---|---|---|
| JP | 2-205963 | 8/1990 |
| JP | 5-100952 | 4/1993 |
| JP | 5-108578 | 4/1993 |
| JP | 6-110844 | 4/1994 |
| JP | 6-243035 | 9/1994 |
| JP | 8-185359 | 7/1996 |
| JP | 8-297642 | 11/1996 |
| JP | 9-128325 | 5/1997 |
| JP | 11-154115 | 6/1999 |
| JP | 2000-132531 | 5/2000 |

* cited by examiner

| BLOCK NUMBER | STATUS INFORMATION | NODE DEVICE NUMBER (TAG INFORMATION) |
|---|---|---|
| a | U | |
| b | S | 1, 2 |
| ⋮ | ⋮ | ⋮ |
| n | P | 2 |

| STATUS INFORMATION | CACHE STATUS |
|---|---|
| U | CACHE DATA IS NOT FOUND IN ANY OF THE NODE DEVICES |
| S | DATA IN THE CACHE IS IDENTICAL TO THE DATA IN THE MEMORY UNIT AND THE SAME CACHE DATA IS FOUND IN SEVERAL NODE DEVICES |
| P | CACHE DATA IS FOUND IN ONE NODE DEVICE ONLY |

FIG. 7

| | |
|---|---|
| EV | REPRESENTATIVE BIT OF ENTRY SHOWING THAT THE CONDITIONS TO SEND THE REPLY DATA TO THE PROCESSOR ARE ESTABLISHED |
| LV | BIT SHOWING THAT THE REPLY DATA BY THE SPECULATIVE READ PATH HAS BEEN RETURNED FROM THE LOCAL MEMORY |
| TV | BIT SHOWING THAT A READ TYPE TRANSACTION HAS BEEN RECEIVED FROM THE PROCESSOR AND ISSUED TO THE SIU / MIU |
| HV | BIT SHOWING THAT THE REPLY DATA HAS BEEN RETURNED FROM THE MEMORY UNIT (MU) MOUNTED ON THE OTHER NODE |
| CV | BIT SHOWING THAT MODIFY DATA HELD IN THE CACHE OF THE REMOTE NODE HAS BEEN RETURNED |
| JV | BIT SHOWING THE SNOOP RESULT |

FIG. 8

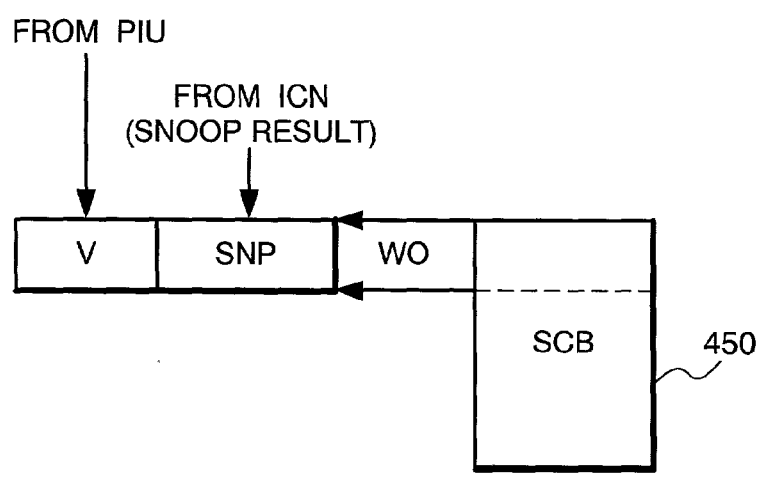

FIG. 9

| V | BIT SHOWING THAT THE PROCESSOR HAS ISSUED A READ TYPE TRANSACTION AND IS WAITING FOR SNOOP PROCESSING |
|---|---|
| SNP | INFORMATION SHOWING THE SNOOP RESULT OBTAINED FROM THE INTERNAL CONNECTION NETWORK |

FIG. 10

| CASE | LV | TV | HV | CV | JV | PROCESSING CONTENTS |
|---|---|---|---|---|---|---|
| (1) | 1 | 1 | 0 | 0 | MODIFY NOT FOUND | LOCAL MEMORY DATA IS SENT TO THE PROCESSOR |
| (2) | 1 | 1 | 0 | 1 | MODIFY FOUND | CACHE DATA IS SENT TO THE PROCESSOR AND THE LOCAL MEMORY DATA (SPECULATIVE READOUT DATA) IS ABOLISHED |
| (3) | 0 | 1 | 1 | 0 | MODIFY NOT FOUND | MEMORY DATA IN THE REMOTE NODE IS SENT TO THE PROCESSOR |
| (4) | 0 | 1 | 1 | 1 | MODIFY FOUND | CACHE DATA IS SENT TO THE PROCESSOR AND THE MEMORY DATA IN THE REMOTE NODE IS ABOLISHED |

FIG. 15

| BLOCK NUMBER | STATUS INFORMATION | NODE DEVICE NUMBER |
|---|---|---|
| a | U | — |
| ⋮ | ⋮ | ⋮ |

FIG. 16

| BLOCK NUMBER | STATUS INFORMATION | NODE DEVICE NUMBER |
|---|---|---|
| a | P | (2) |
| ⋮ | ⋮ | ⋮ |

FIG. 17

| BLOCK NUMBER | STATUS INFORMATION | NODE DEVICE NUMBER |
|---|---|---|
| b | U | — |
| ⋮ | ⋮ | ⋮ |

FIG. 18

| BLOCK NUMBER | STATUS INFORMATION | NODE DEVICE NUMBER |
|---|---|---|
| b | P | (2) |
| ⋮ | ⋮ | ⋮ |

(a)

| V | SNP1 | SNP2 |
|---|------|------|
| 1 |      |      |

(b)

| V | SNP1 | SNP2 |
|---|------|------|
| 1 | SNOOP RESULT | SNOOP RESULT |

DATA ACCESS METHOD IN THE NETWORK SYSTEM AND THE NETWORK SYSTEM

BACKGROUNDS OF THE INVENTION

1. Field of the Invention

The present invention relates to data access technology preferably applicable to a network system, and particularly to a NUMA (Non Uniform Memory Access model) system.

2. Description of the Related Art

FIG. 21 shows a block configuration diagram showing an example of the NUMA system. In this system, each of several node devices $1000a, \ldots, 1000n$ is connected to the other with a bus 1040 so that they can mutually send and receive the required information between them. Each node device has a CPU $1010a$ ( $\ldots, 1010n$), a local memory $1020a$ ( $\ldots, 1020n$) and a control unit $1030a$ ( $\ldots, 1030n$). In addition, as shown in FIG. 22, the local memories $1020a, \ldots, 1020n$ of the node devices constitute a common memory. The CPU $1010a, \ldots, 1010n$ of the node devices are configured so that they can access such common memory.

In the NUMA system as described above, when the CPU $1010a, \ldots, 1010n$ in the node devices $1000a, \ldots, 1000n$ access the common memory, the latency, which is the period from the start of reading to the completion of data readout, differs among them. A cache is incorporated in each of the CPU$1010a, \ldots, 1010n$ so that the number of accesses from a certain node device (hereinafter referred to as the self node device or local node) to the cache in the CPU of the other node device (hereinafter sometimes referred to as the remote node) can be reduced.

If no restriction is imposed to copying of the data stored in the common memory to the cache memory, however, the data copy having the same address in the common memory may be stored in the cache memories of several processors, which would result in frequent accesses between the node devices. This spoils the latency of the access to the cache memory or the local memory of the remote node, which leads to a poorer system performance.

Further, since the local memories constituting the common memory are mounted individually one by one for the node devices in this system, the latency difference between the local node and the remote node becomes larger. This also results in a lower system performance.

SUMMARY OF THE INVENTION

A first object of the present invention is to provide a data access method which enables latency reduction, a network system and a recording medium containing a data access program.

Another object of the present invention is to reduce the latency difference among nodes.

According to the first aspect of the invention, a data access method used in a network system having several node devices connected for communications configured so that each node device can execute certain processing by accessing memories in the several node devices or cache memories at a higher access speed wherein each node device executing the speculative access to the memories in the system while reading out, from the tag memory, the tag information as the information related to the data storage status in the cache memories provided in the system, and deciding whether or not to abolish the data acquired from the memories by the speculative access according to the tag information read out.

According to the present invention, a speculative access is made to the memory in the system at the same time as the tag information readout from the tag memory and, based on the tag information read out, whether or not to abolish the data obtained from the memory by the speculative access is decided. This procedure is not like the conventional method with a series of operations where the tag information is read out first and, if the read out tag information shows that the data to be accessed is not stored in the cache memory in the system, the memory access operation is further executed. Instead, the memory access is executed at the same time as the tag information readout and, when the read out tag information shows that the data to be accessed is not stored in the cache memory of the system, the data already obtained by the above access is adopted. Thus, the latency can be reduced.

According to the second aspect of the invention, a data access method used in a network system having several node devices connected for mutual communications configured so that each node device can execute certain processing by reading out data from memories in the several node devices or cache memories at a higher access speed wherein each node device executing the speculative readout of the data from the memories in the node devices while reading out, from the tag memory, the tag information as the information related to the data storage status in the cache memories provided in the system, judging whether the same data as the data subject to the speculative readout is in any of the cache memories based on the tag information read out, sending the speculative readout data to the processor in the self node device when the same data as the data subject to the speculative readout is not found in any of the cache memories, and acquiring, when the same data as the data subject to the speculative readout is in one of the cache memories, such data in the cache memory and sending the data to the processor in the self node device.

In the preferred construction, the speculative readout data is abolished when the data found in the cache memory is acquired and sent to the processor in the self node device.

In another preferred construction, each node device speculatively reads out the data from the memory in the self node device while reading out the tag information from the tag memory.

In another preferred construction, each node device speculatively reads out the data from the memory in the other node device while reading out the tag information from the tag memory.

According to the third aspect of the invention, a network system having several node devices connected for communications configured so that each node device can execute certain processing by accessing memories in the several node devices or cache memories at a higher access speed wherein each node device comprises access means to speculatively access the memories in the system while reading out, from the tag memory, the tag information as the information related to the data storage status in the cache memories provided in the system and judgment means to judge whether or not to abolish the data acquired from the memories by the speculative access according to the tag information read out.

According to the fourth aspect of the invention, a network system having several node devices connected by a communication mechanism for mutual communications configured so that each node device can execute certain processing by reading out data from memories in the several node devices or cache memories at a higher access speed wherein each node device comprises speculative readout means to execute the speculative readout of the data from the memories in the node devices while reading out, from the tag memory, the tag information as the information related to the data storage status in the cache memories provided in the system, a judgment means to judge whether the same data as the data subject to the speculative readout is in any of the cache memories based on the tag information read out, and a read data processing means which sends the speculative readout data to the processor in the self node device when the same data as the data subject to the speculative readout is judged not existing in any of the cache memories and, when the same data is judged existing in one of the cache memories, acquires such data in the cache memory and sends the data to the processor in the self node device.

In the preferred construction, the data processing means abolishing the speculative readout data when the data found in the cache memory is acquired and sent to the processor in the self node device.

In another preferred construction, the speculative readout means speculatively reads out the data from the memory in the self node device.

In another preferred construction, the speculative readout means speculatively reads out the data from the memory in the other node device.

In another preferred construction, the tag memory is provided in the communication mechanism.

According to the fifth aspect of the invention, a computer readable memory storing a data access program for controlling the data access in a network system having several node devices connected for mutual communications configured so that each node device can execute certain processing by accessing memories in the several node devices or cache memories at a higher access speed wherein the data access program executing speculative access processing for the memories in the system while reading out, from the tag memory, the tag information as the information related to the data storage status in the cache memories provided in the system and processing to judge whether or not to abolish the data acquired from the memories by the speculative access according to the tag information read out.

According to another aspect of the invention, a computer readable memory storing a data access program for controlling the data access in a network system having several node devices connected for mutual communications configured so that each node device can execute certain processing by reading out data from memories in the several node devices or cache memories at a higher access speed wherein the data access program executing speculative readout processing to read out the data from the memories in the node devices while reading out, from the tag memory, the tag information as the information related to the data storage status in the cache memories provided in the system, judgment processing to judge whether the same data as the data subject to the speculative readout is found in any of the cache memories based on the tag information read out, and processing when the same data as the data subject to the speculative readout is not found in any of the cache memories to send the speculative readout data to the processor in the self node device and, processing when the same data as the data subject to the speculative readout is found in one of the cache memories to acquire such data in the cache memory and send the data to the processor in the self node device.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 7 is an explanatory view of the bits stored in the bit memory according to the first embodiment;

FIG. 8 is a configuration diagram of the SCB according to the first embodiment;

FIG. 9 is an explanatory view of the control information used in the SCB according to the first embodiment;

FIG. 10 is an explanatory view to show the operation in the first embodiment;

FIG. 15 is an explanatory view of a specific example of tag information to explain the first operation example of the first embodiment;

FIG. 16 is an explanatory view of a specific example of tag information to explain the second operation example of the first embodiment;

FIG. 17 is an explanatory view of a specific example of tag information to explain the third operation example of the first embodiment;

FIG. 18 is an explanatory view of a specific example of tag information to explain the fourth operation example of the first embodiment;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
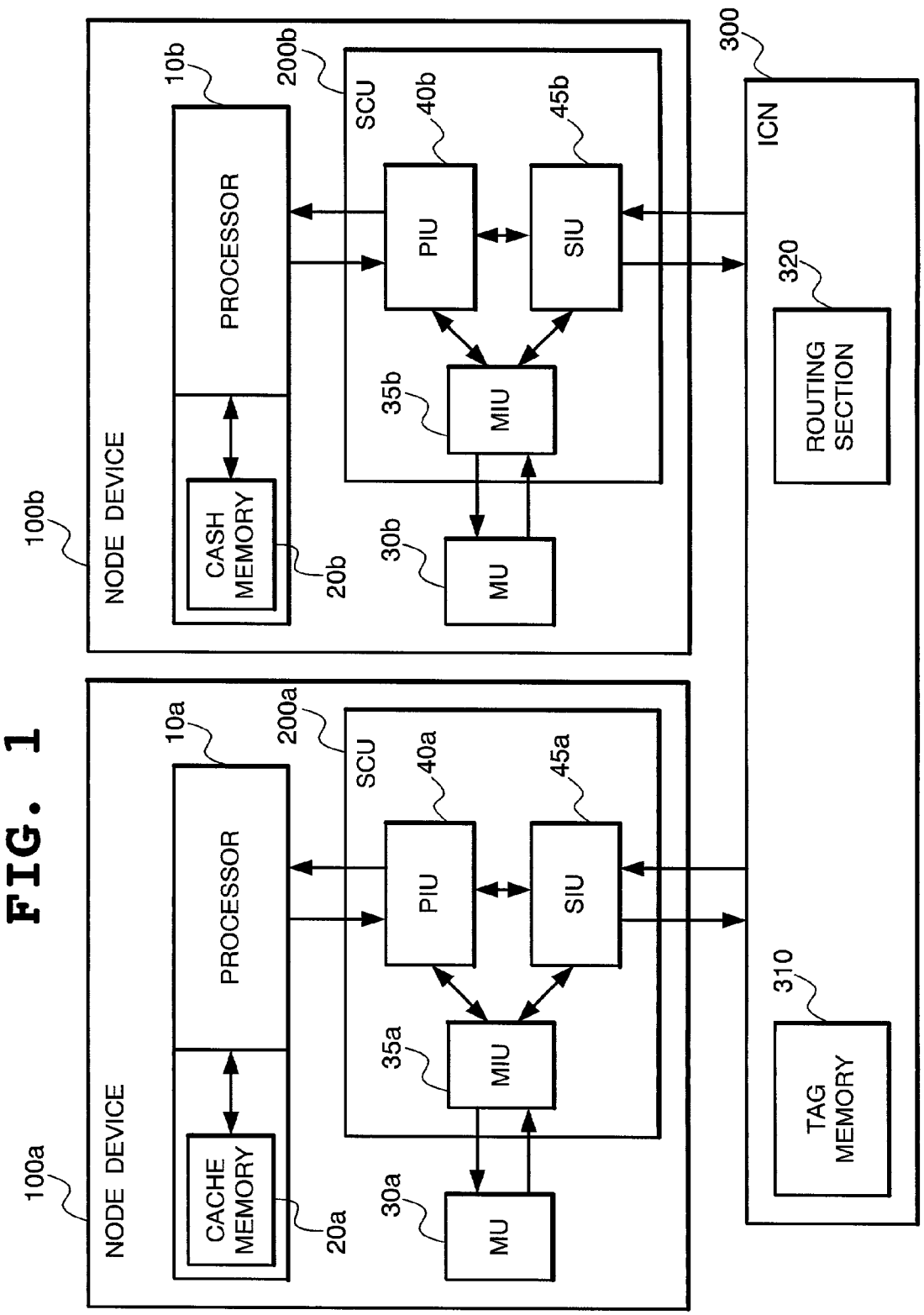
FIG. 1 is a block diagram to show a network system according to a first embodiment of the present invention.

Referring to the attached figures, preferred embodiments of the present invention will be described below. Though the explanation below will be given about cases where two node devices constitute a NUMA system so as to facilitate understanding of the present invention, a NUMA system may be constituted with 3 or more node devices. A network system as shown in FIG. 1 has two node devices 100a and 100b, which are mutually connected by an ICN (Internal Connection Network) 300 so that they can send and receive the required information between them.

Since the node devices 100a and 100b have the same configuration, the configuration of the node device 100a only is explained here. The node device 100a comprises a memory unit (MU) 30a, a processor 10a incorporating a cache memory 20a, which enables access at a higher speed than such memory unit, and a system control unit (SCU) 200a for access control. The processor 10a is configured so that the cache coherency is assured by write-back, write-through or other known algorithms.

The system control unit (SCU) 200a comprises a PIU (Processor Interface Unit) 40a for interface control operation with the processor 10a, an MIU (Memory Interface Unit) 35a for interface control operation with the MU (Memory Unit) 30a and an SIU (System Interface Unit) 45a for interface control operation with the other node device 100b. The PIU 40a has a function to detect the home node (the node device where the applicable address is located) based on the transaction address issued by the processor 10a. Further, as shown in FIG. 4, the memory unit (MU) 30a of the node device 100a and the memory unit (MU) 30b of the node device 100b constitute a common memory and the processors 10a and 10b of the node devices 100a and 100b are configured so that they can access such common memory.

The ICN 300 as a communication mechanism is provided with a routing section 320 for data routing and a tag memory 310 to store the tag information.

Figures 2, 3, 4:
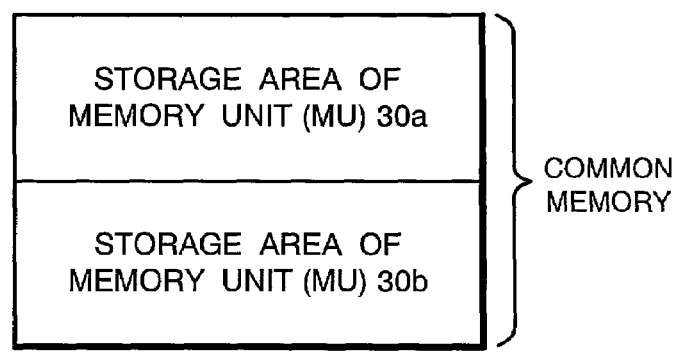
FIG. 2 is an explanatory view of the tag information to be stored in the tag memory in the first embodiment.
FIG. 3 is an explanatory view of the status information in the first embodiment.
FIG. 4 is an explanatory view showing the memory mapping status of the common memory in the first embodiment.

As shown in FIG. 2, the tag information has a block data number (Block No.) and the status information and the node device No. as a pair.

As shown in FIG. 3, the status information "U" shows that the data to be accessed is not found in any of the cache memories 20a and 20b in the node devices 100a and 100b. In this case, no node device No. is given to the information. The status information "S" shows that the data in the cache memory is identical to the data in the memory unit and the cache memories 20a and 20b in several node devices (100a and 100b in this case) store the same data as the data to be accessed. In this case, the number of the node device having the applicable cache data is associated as the node device number. The status information "P" shows that the cache data is in a single node device (100a or 100b in this case). In this case, the number of the node device having this cache data is associated as the node device number.

Figure 5:
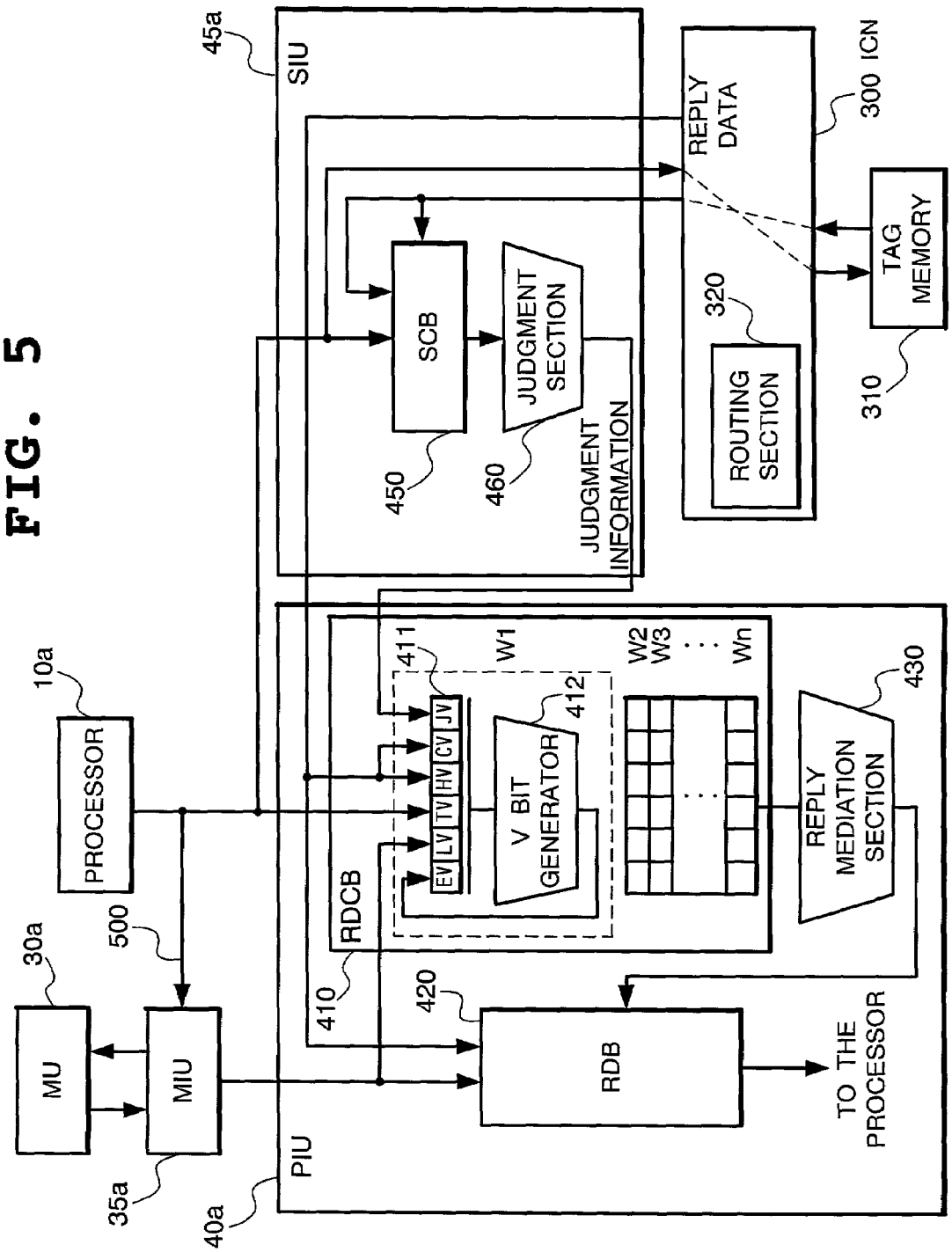
FIG. 5 is a configuration view of the major part according to the first embodiment of the present invention.

FIG. 5 is a configuration diagram of the major section according to the present invention. The PIU 40a comprises an RDB (Reply Data Buffer) 420 to store the reply data to be sent to the processor 10a for several entries, an RDCB (Reply Data Control Buffer) 410 having control units (W1 to Wn) for the number of entries to the RDB 420 and a reply mediation section 430 which, from the entries in the RDCB 410 allowed to send a reply to the processor 10a, selects and outputs one entry by mediation so that it is stored to the RDB 420.

Figure 6:
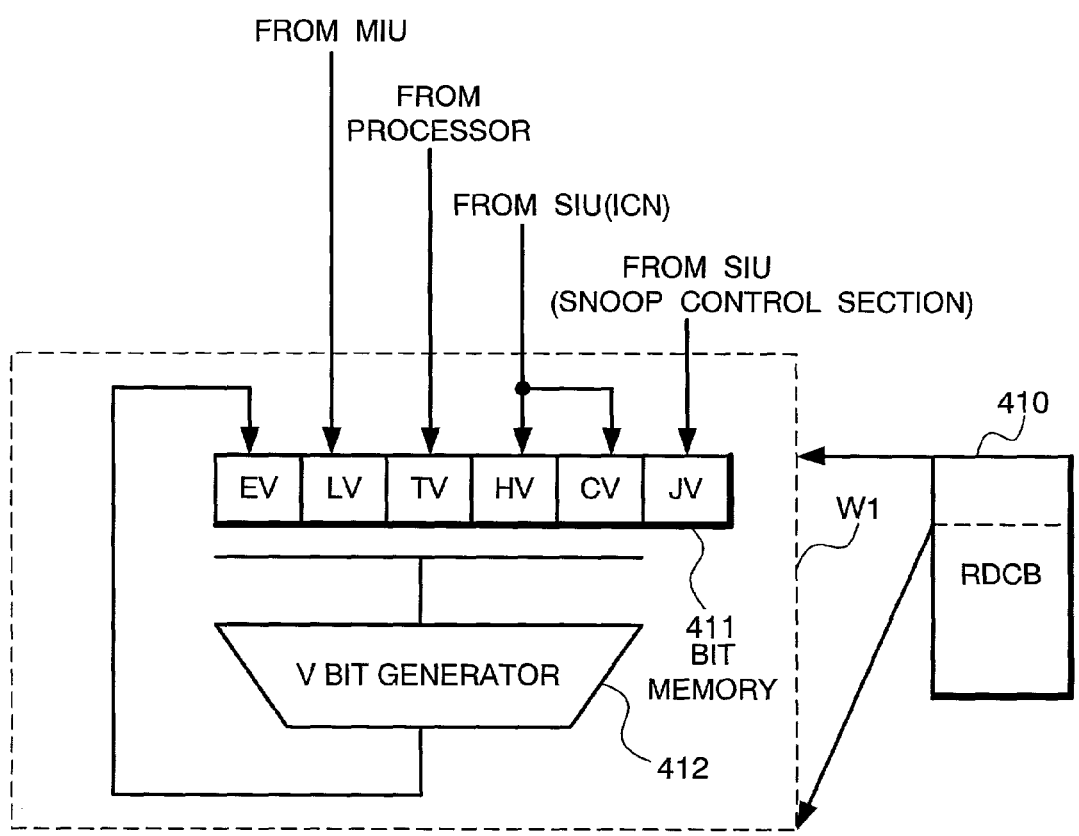
FIG. 6 is a configuration diagram of a control unit in the RDCB according to the first embodiment.

As shown in FIG. 6, one control unit in the configuration of the RDCB 410 (W1, for example) has a bit memory 411 and a V bit generator 412. Such a unit is provided for every entry. As shown in FIG. 7, there are six types of bits to be stored to the bit memory 411: "TV bit (Transaction V bit)" shows that the PIU 40a has received the read type transaction from the processor 10a and issued the received read type transaction to the MIU and the SIU; "LV bit (Local Memory V bit)" shows that the reply data has been returned from the local memory, which is a memory unit (MU) in the local node; "HV bit (Home Node V bit)" shows that, when the other node device was a home node, the reply data is returned from the memory unit (MU) of the home node; "CV bit (Cache V bit)" shows that the reply data has been returned from the cache memory in the remote node; "JV bit (Judgment V bit)" shows the snoop result returned from the SIU; and "EV bit (Entry V bit)" shows that, according to the LV, TV, HV, CV and JV bits, the reply data stored in the RDB 420 of the corresponding entry can be sent to the processor 10a.

The operation to read out the tag information from the tag memory 310 is called the "Snoop operation" and the result of such readout is called the "Snoop result".

The V bit generator 412 generates the EV bit according to the LV, TV, HV, CV and JV bits. However, the timing when the EV bit generation is reported to the PIU 40a is not adjusted among entries. If several EV bits are made active for several entries, the reply data stored in the entry of the RDB 420 output through mediation by the reply mediation section 430 is sent to the processor 10a and, at the same time, the V bit generator 412 resets the EV bit of the RDCB 410 to disable the entry.

On the other hand, while the snoop processing is executed, speculative access is conducted, according to the read type transaction received from the CPU 10a, for the MU 30a as the local memory and the MU 30b in the remote node 100b. In the example shown in FIG. 5, the data are read out from the MU 30a serving as the local memory according to the route "PIU 40a→MIU 35a→MU 30a" via a speculative read path 500, which is an exclusive path for speculative readout of the MU 30a as the local memory.

The SIU 45a is provided with an SCB (Snoop Control Buffer) 450 and a judgment section 460. The SCB 450 keeps the snoop result waiting data and the read out snoop result obtained from the snoop processing of the tag memory 310 executed corresponding to the read type transaction issued by the PIU 40a, and the judgment section 460 reads out the snoop results from the SCB 450, generates the snoop results for the individual transactions and outputs them as the judgment information to the RDCB 410.

As shown in FIGS. 8 and 9, the SCB 450 stores two types of information for the number of entries. These two types of information includes "V bit" showing that the snoop processing to be executed corresponding to the read type transaction issued by the PIU 40a is in the wait status and "SNP information" showing the snoop processing result from the tag memory 310. When the snoop result is obtained when the V bit is active, the judgment section 460 issues the judgment information corresponding to the entry in the RDCB 410 for the applicable transaction and sets the JV bit. The program is designed so that the transaction processing in the SIU 45a is completed with clearing the V bit and SNP information for the entry in the SCB 450 subjected to judgment by the judgment section 460.

The judgment section 460 generates and outputs the judgment information based on the snoop result of the tag memory 310, but the judgment information depends on the protocol of the cache coherency. For example, if the popular MESI protocol is used, there will be two types of judgment information to be sent to the RDCB 410: "Modify found" (Data found in the cache memory) showing that the cache memory 20b of the remote node 100b has some data for the modify line and "Modify not found" (No data found in the cache memory) showing that the cache of the remote node does not keep any data for the modify line.

FIRST OPERATION EXAMPLE

Next, the operation of the present invention will be described below. First of all, referring to FIG. 11 and other figures, case (1) of FIG. 10 will be described. In this case, the node device 100a serves as the home node and a read type transaction for the local memory (MU 30a) is issued from the processor 10a. Note here that, as shown in FIG. 15, any of the data belonging to the block data with the block No. a stored in the tag memory 310 is subject to readout by the read type transaction.

Figure 11:
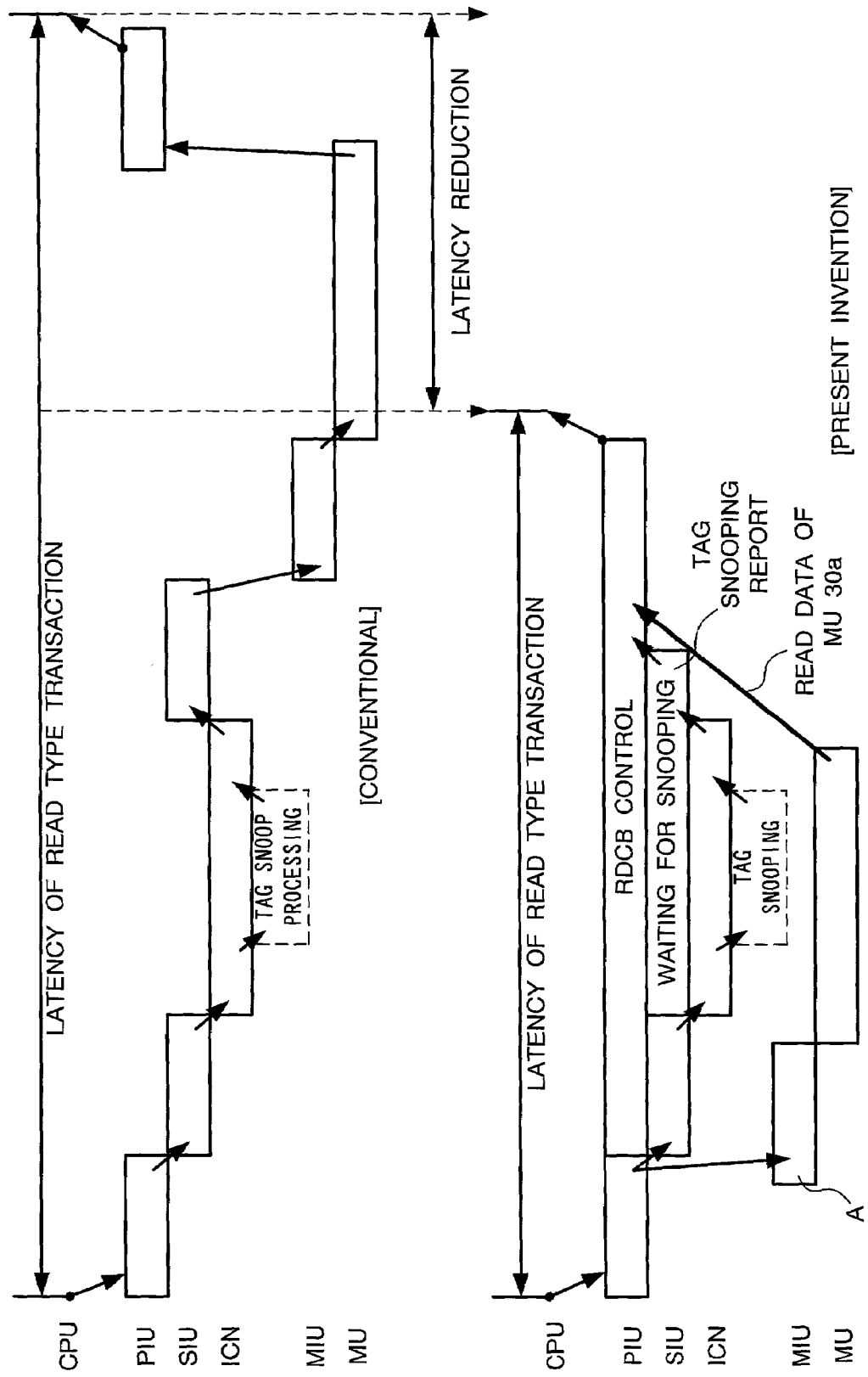
FIG. 11 is a timing chart to illustrate the latency difference between the first operation example of the first embodiment and the prior art.

Shown at the lower part of FIG. 11 is a time chart illustrating the processing procedure of the operation in this case. As shown in FIG. 11, when the processor 10a of the node device 100a issues a read type transaction, the PIU 40a receives it and, by the routing function to detect the home node of the transaction, finds that the memory unit to be accessed by the transaction is the MU 30a, which is the local memory. The PIU 40a has the SIU 45a conduct the snoop processing for the tag memory 310 and, at the same time, instructs the MIU 35a to conduct reading control for the MU 30a via the speculative read path 500 (Code A in FIG. 11). The speculative reading is conducted by reading data out of the MU 35a as the local memory according to the route "PIU 40a→MIU 35a→MU 30a→MIU 35a→PIU 40a".

On the other hand, the PIU 40a issues a transaction to the SIU 45a in order to conduct snoop processing for the tag memory 310. The SIU 45a issues the transaction to conduct snoop processing for the tag memory 310 via the ICN 300. Then, by the operation of the routing section 320, the transaction is executed according to the route "SIU 45a→ICN 300→Tag memory 310→ICN 300→SIU 45a" so that the snoop information is read out of the tag memory 310. Since the status information is "U", the SIU 45a judges that the snoop result of this transaction is "Modify not found" (which means that the applicable data is not found in either cache memory) and sends the judgment information to that effect to the PIU 40a.

The PIU 40a checks that the read type transaction issued by the processor 10a has been issued to the MIU 35a and the SIU 45a (TV bit), that the data of the local memory has been returned from the MU 30a via the MIU 35a (LV bit), and that the SIU 45a has sent as the snoop result the "Modify not found" information showing that the line to be accessed in the transaction is not registered as "Modify" in the cache memory 20b of the remote node 100b. Because these three conditions are satisfied, the PIU 40a sends the reply data of the transaction to the processor 10a as the data read out from the local memory (MU 30a).

Next, referring to FIGS. 5 to 10, the operation for the read type transaction as described above will be described in more details below. When the CPU 10a issues a read type transaction, the PIU 40a uses the speculative read path 500 to issue the read type transaction to the MU 30a as the local memory via the MIU 35a. At the same time, to execute snoop processing for the tag memory 310, the PIU 40a issues the read type transaction to the SIU 45a. Since the PIU 40a has issued the transaction to the MIU 35a and the SIU 45a, the TV bit of the corresponding control unit in the RDCB 410 is made active. For the transaction issued to the MU 30a, the reply data is sent to the PIU 40a via the MIU 35a.

The PIU 40a registers the sent reply data to the corresponding entry in the RDB 420 and activates the LV bit of the control unit in the RDCB 410 for this entry registered to the RDB 420.

On the other hand, for the transaction issued to the SIU 45a, the V bit of the corresponding entry in the SCB 450 is kept active until the snoop processing result for the tag memory 310 is returned. At the same time as the readout of the local memory, the routing section reads out the tag information according to the route "ICN 300→Tag memory 310→ICN 300" to execute snoop processing for the tag memory 310, and the read out tag information is sent to the SIU 45a. The sent tag information is registered to the SNB field of the corresponding entry in the SCB 450.

When the V bit and the SNB information are prepared, the judgment section 460 outputs the snoop result of the transaction as the judgment information and has this judgment information registered to the JV bit of the corresponding control unit in the RDCB 410. In this example, the tag information is "Modify not found" and it is judged that the read data read out from the local memory (MU 30a) should be adopted as the reply data. In the PIU 40a, all of the TV bit, LV bit and JV bit are made active as the entry information for the RDCB 410 corresponding to the read type transaction. Further, since the JV bit has "Modify not found", the V bit generator 412 makes the EV bit active (Refer to (1) of FIG. 10). The entry with the EV bit active is output through mediation by the reply mediation section 430 and the data corresponding to it is output as the reply data from the RDB 420. By sending of the reply data to the processor 10a, which has issued the read type transaction, the processing for the read type transaction is completed.

In the conventional procedure, as shown in the lower illustration of FIG. 11, the tag information is read out first and, if it has the status information "U", the readout operation from the local memory is executed. With the speculative readout according to embodiments of the present invention, the latency may be reduced.

SECOND OPERATION EXAMPLE

Next, referring to FIG. 12 and other figures, case (2) of FIG. 10 will be described. In this case, the node device 100a serves as the home node and a read type transaction for the local memory (MU 30a) is issued from the processor 10a. Note here that, as shown in FIG. 16, any of the data belonging to the block data with the block No. a stored in the tag memory 310 is subject to readout by the read type transaction and the node device 100b is provided with the node device number "(2)".

Figure 12:
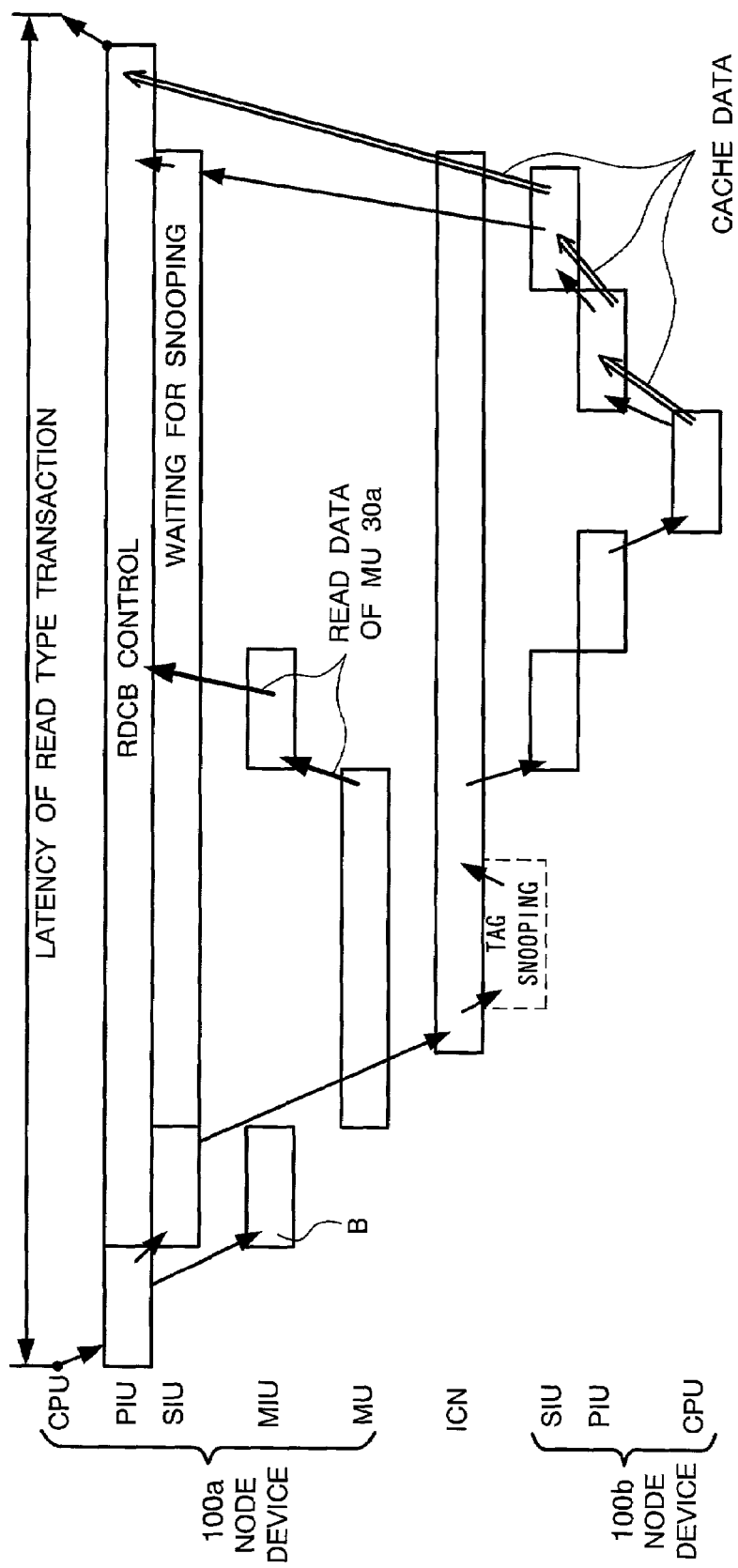
FIG. 12 is a timing chart to illustrate the second operation example of the first embodiment.

FIG. 12 shows a time chart illustrating the processing procedure of the operation in this case. As shown in FIG. 12, when the processor 10a of the node device 100a issues a read type transaction, the PIU 40a receives it and, by the routing function to detect the home node of the transaction, finds that the memory unit to be accessed by the transaction is the MU 30a, which is the local memory. The PIU 40a has the SIU 45a conduct the snoop processing for the tag memory 310 and, at the same time, instructs the MIU 35a to conduct reading control for the MU 30a via the speculative read path 500 (Code B in FIG. 12).

The speculative reading is conducted by reading data out of the MU 35a as the local memory according to the route "PIU 40a→MIU 35a→MU 30a→MIU 35a→PIU 40a". On the other hand, the PIU 40a issues a transaction to the SIU 45a in order to conduct snoop processing for the tag memory 310.

The SIU 45a issues the transaction to conduct snoop processing for the tag memory 310 via the ICN 300. Then, by the operation of the routing section 320, the transaction is executed according to the route "SIU 45a ICN 300→Tag memory 310→ICN 300→SIU 45a" so that the snoop information is read out of the tag memory 310. Since the status information is "P", the SIU 45a judges that the snoop result of this transaction is "Modify found" (which means that the applicable data is found in the cache memory of the node device 100b) and sends the control information to read out the cache data to the SIU 45b of the other node device 100b.

According to the route "SIU 45b→PIU 40b→Processor 10b→Cache memory 20b→Processor 10b→PIU 40b→SIU 45b→ICN 300", the cache data is sent to the ICN 300 and the routing section 320 sends it to the SIU 45a of the node device 100a. Then, the SIU 45a sends it to the PIU 40a.

The PIU 40a checks that the read type transaction issued by the processor 10a has been issued to the MIU 35a and the SIU 45a (TV bit), that the data of the local memory has been returned from the MU 30a via the MIU 35a (LV bit), that the cache data to be stored to the cache memory 20b of the remote node 100b has been sent (CV bit) and that the SIU 15a has sent as the snoop result the "Modify found" information showing that the line to be accessed in the transaction is registered as "Modify" in the cache memory 20b of the remote node 100b. Because these four conditions are satisfied, the PIU 40a sends the reply data of the transaction to the processor 10a as the data read out from the cache memory 20b of the node device 100b. The data read out from the MU 30a earlier is abolished.

Thus, according to the first and the second operation examples, the node device 100a reads out the tag information from the tag memory 310 and at the same time speculatively reads out the data from the memory unit (MU) 30a in the self node device 100a. When the read out tag information shows that the same data as that subject to the speculative readout (data of the same address or the same address range, for example) is not in either of the cache memories 20a and 20b, the speculative readout data is sent to the processor 10a in the self node device 100a.

On the other hand, when the read out tag information shows that the same data as that subject to the speculative readout is in the cache memory 20a or 20b, the data in the cache memory 20a or 20b is obtained and sent to the processor 10a in the self node device 100a and the speculative readout data is abolished.

The procedure in these examples is not like the conventional procedure (Refer to the upper illustration of FIG. 11) with a series of operations in which the tag information is read out first and, when the read out tag information shows that the same data as the data subject to the readout is not in the cache memories 10a and 10b, data are further read out from the memory unit (MU) 30a in the self node device 100a. Instead, the speculative data readout is executed from the memory unit (MU) 30a in the self node device 100a at the same time as the tag information readout and, when the read out tag information shows that the same data as the data subject to the speculative readout is not found in either of the cache memories 20a and 20b (by the status information "U", for example), the data already obtained by the speculative readout is sent to the processor 10a, which reduces the latency.

THIRD OPERATION EXAMPLE

Figure 13:
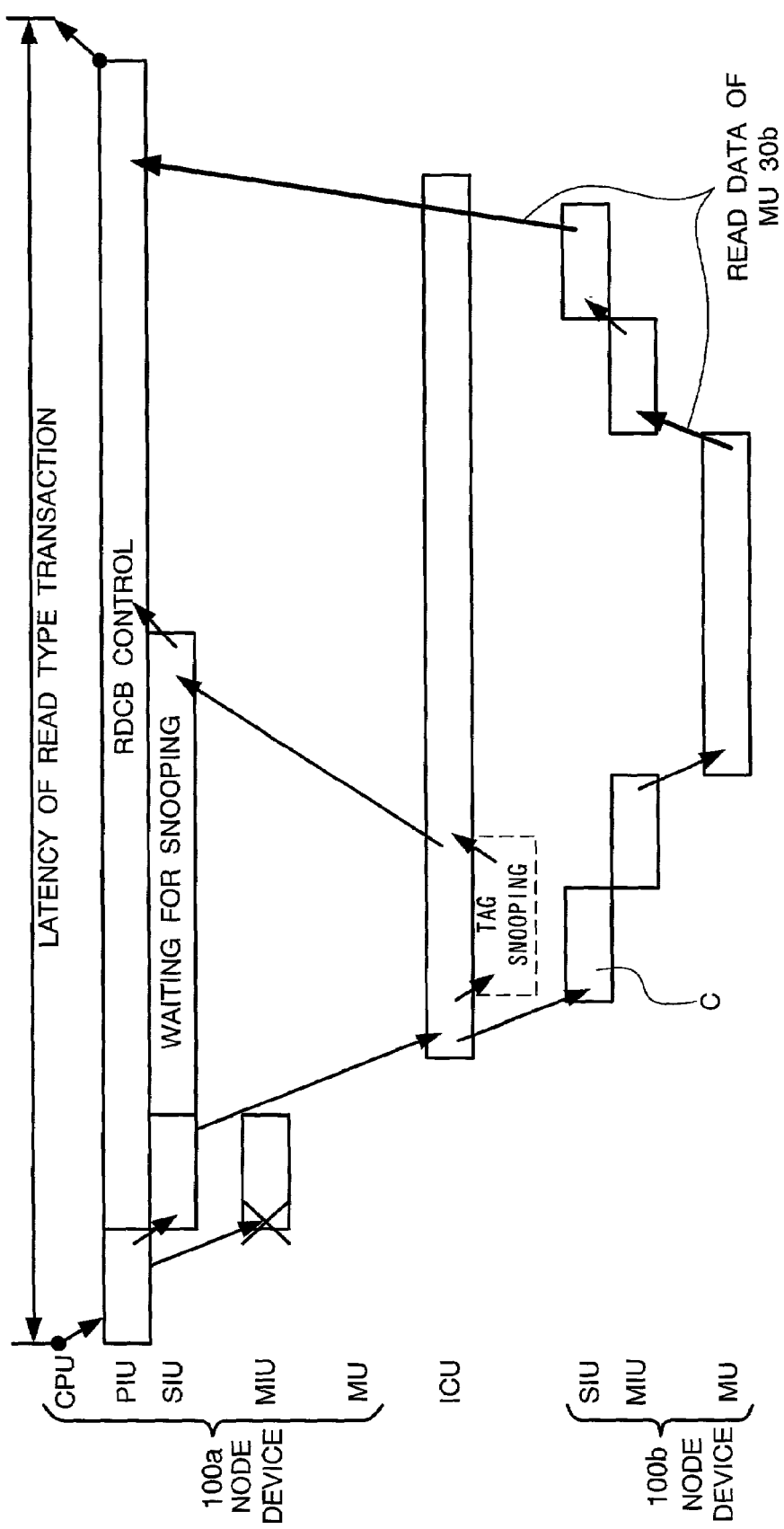
FIG. 13 is a timing chart to illustrate the third operation example of the first embodiment.

Referring now to FIG. 13 and other figures, case (3) of FIG. 10 will be described. In this case, the other node device 100b serves as the home node and a read type transaction for the memory unit (MU 30b) is issued from the processor 10a. Note here that, as shown in FIG. 17, any of the data belonging to the block data with the block No. b stored in the tag memory 310 is subject to readout by the read type transaction.

FIG. 13 shows a time chart illustrating the processing procedure of the operation in this case. As shown in FIG. 13, when the processor 10a of the node device 100a issues a read type transaction, the PIU 40a receives it and, by the routing function to detect the home node of the transaction, finds that the memory unit to be accessed by the transaction is the MU 30b in the remote node 100b. The PIU 40a has the SIU 45a conduct the snoop processing for the tag memory 310 and, at the same time, sends the control information to the ICN 300 to execute the speculative readout for the MU 30b.

The routing section 320 sends it to the SIU 45b (Code C in FIG. 13). The speculative reading is conducted by reading out the data from the MU 30b of the remote node 100b according to the route SIU 45b→MIU 35b→MU 30b→MIU 35b→SIU 45b. The read out data is sent to the ICN 300 and, by the operation of the routing section 320, further sent to the PIU 40a via the SIU 45a of the node device 100a.

On the other hand, the PIU 40a issues a transaction to the SIU 45a in order to conduct snoop processing for the tag memory 310. The SIU 45a issues the transaction to conduct snoop processing for the tag memory 310 via the ICN 300. Then, by the operation of the routing section 320, the transaction is executed according to the route "SIU 45a→ICN 300→Tag memory 310→ICN 300→SIU 45a" so that the snoop information is read out of the tag memory 310. Since the status information is "U", the SIU 45a judges that the snoop result of this transaction is "Modify not found" (which means that the applicable data is not found in either cache memory) and sends the judgment information to that effect to the PIU 40a.

The PIU 40a checks that the read type transaction issued by the processor 10a has been issued to the MIU 35a and the SIU 45a (TV bit), that the data has been returned from the MU 30b of the other node device (HV bit), and that the SIU 45a has sent as the snoop result the "Modify not found" information showing that the line to be accessed in the transaction is not registered as "Modify" in the cache memory 20b of the remote node 100b. Because these three conditions are satisfied, the PIU 40a sends the reply data of the transaction to the processor 10a as the data read out from the MU 30b of the local node 100b.

FOURTH OPERATION EXAMPLE

Figure 14:
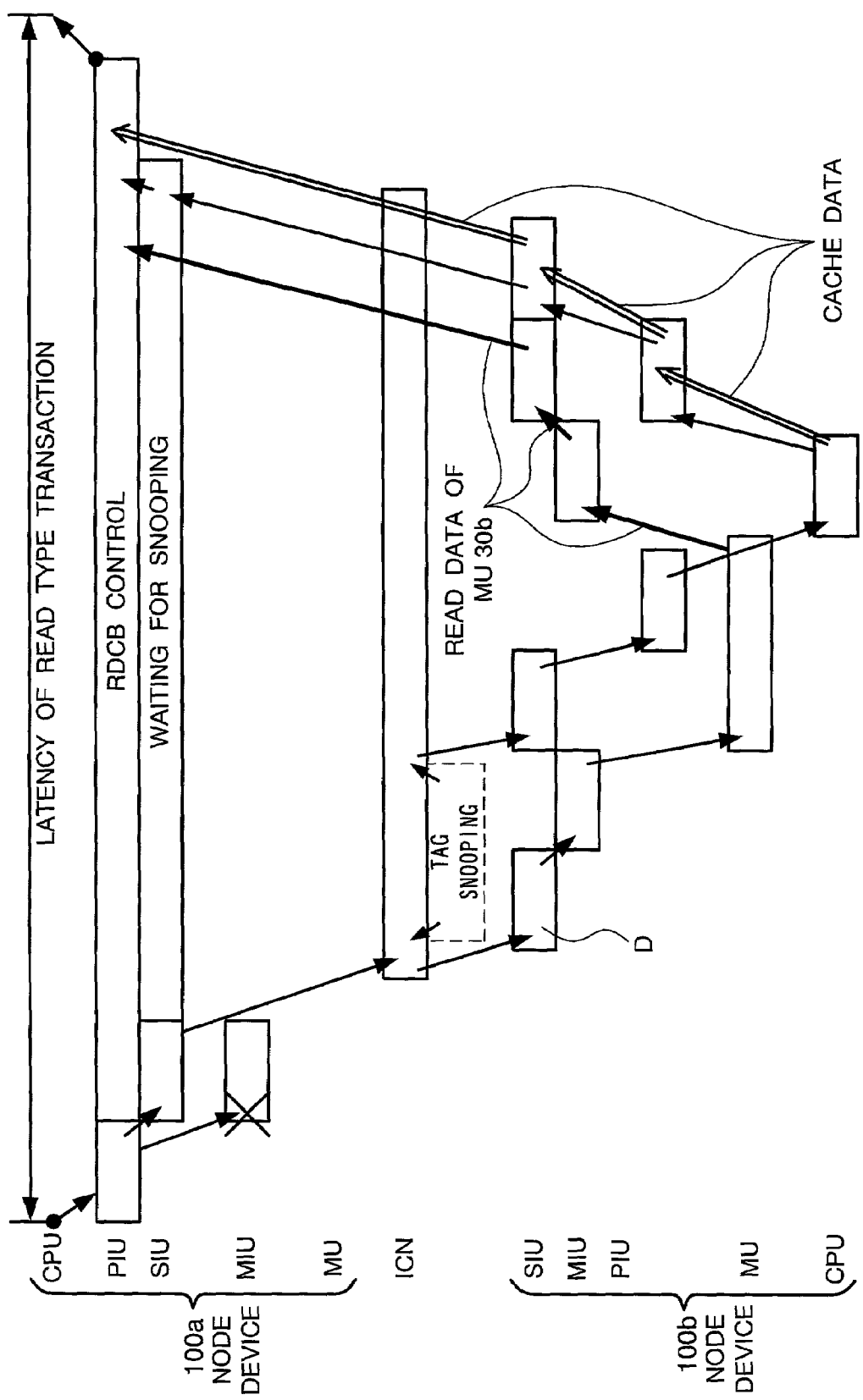
FIG. 14 is a timing chart to illustrate the fourth operation example of the first embodiment.

Referring now to FIG. 14 and other figures, case (4) of FIG. 10 will be described. In this case, the other node device 100b serves as the home node and a read type transaction for the memory unit (MU 30b) is issued from the processor 10a. Note here that, as shown in FIG. 18, any of the data belonging to the block data with the block No. b stored in the tag memory 310 is subject to readout by the read type transaction, and the node device 100b is provided with the node device number "(2)".

FIG. 14 shows a time chart illustrating the processing procedure of the operation in this case. As shown in FIG. 14, when the processor 10a of the node device 100a issues a read type transaction, the PIU 40a receives it and, by the routing function to detect the home node of the transaction, finds that the memory unit to be accessed by the transaction is the MU 30b in the local node 100b. The PIU 40a has the SIU 45a conduct the snoop processing for the tag memory 310 and, at the same time, sends the control information to the ICN 300 to execute the speculative readout for the MU 30b. The routing section 320 sends it to the SIU 45b (Code D in FIG. 14). The speculative reading is conducted by reading out the data from the MU 30b of the remote node 100b according to the route SIU 45b→MIU 35b→MU 30b→MIU 35b→SIU 45b. The read out data is sent to the ICN 300 and, by the operation of the routing section 320, further sent to the PIU 40a via the SIU 45a of the node device 100a.

On the other hand, since the status information is "P", the SIU 45a judges that the snoop result of this transaction is "Modify found" (which means that the applicable data is found in the cache memory of the node device 100b) and sends the control information to read out the cache data to the SIU 45b of the other node device 100b. Then, according to the route "SIU 45b→PIU 40b→Processor 10b→Cache memory 20b→Processor 10b→PIU 40b→SIU 45b→ICN 300", the cache data is sent to the ICN 300 and the routing section 320 sends it to the SIU 45a of the node device 100a. Then, the SIU 45a sends it to the PIU 40a.

The PIU 40a checks that the read type transaction issued by the processor 10a has been issued to the MIU 35a and the SIU 45a (TV bit), that the data has been returned from the MU 30b of the other node device (HV bit), that the cache data to be stored to the cache memory 20b of the remote node 100b has been sent (CV bit) and that the SIU 45a has sent as the snoop result the "Modify found" information showing that the line to be accessed in the transaction is registered as "Modify" in the cache memory 20b of the remote node 100b. Because these four conditions are satisfied, the PIU 40a sends the reply data of the transaction to the processor 10a as the data read out from the cache memory 20b of the node device 100b. The data read out from the MU 30b earlier is abolished.

Thus, according to the third and the fourth operation examples, the node device 100a reads out the tag information from the tag memory 310 and at the same time speculatively reads out the data from the MU 30b in the other node device 100b. When the read out tag information shows that the same data as that subject to the speculative readout (data of the same address or the same address range, for example) is not in either of the cache memories 20a and 20b, the speculative readout data is obtained and sent to the processor 10a in the self node device 100a. On the other hand, when the read out tag information shows that the same data as that subject to the speculative readout is in the cache memory 20a or 20b, the data in the cache memory 20a or 20b is obtained and sent to the processor 10a in the self node device 100a and the speculative readout data is abolished.

The procedure in these examples is not like the conventional procedure with a series of operations in which the tag information is read out first and, when the read out tag information shows that the same data as the data subject to the readout is not in the cache memories 20a and 20b, data are further read out from the memory in the other node device 100b. Instead, the speculative data readout is executed from the MU 30b in the other node device 100b at the same time as the tag information readout and, when the read out tag information shows that the same data as the data subject to the speculative readout is not found in either of the cache memories 20a and 20b (by the status information "U", for example), the data already obtained by the speculative readout is sent to the processor 10a, which reduces the latency.

In the embodiment described above, the tag memory 310 is provided in the ICN 300 as the communication mechanism, and it takes substantially equal time to read out the tag from any node device 100a or 100b. This enables reduction of latency difference among node devices.

Figure 19:
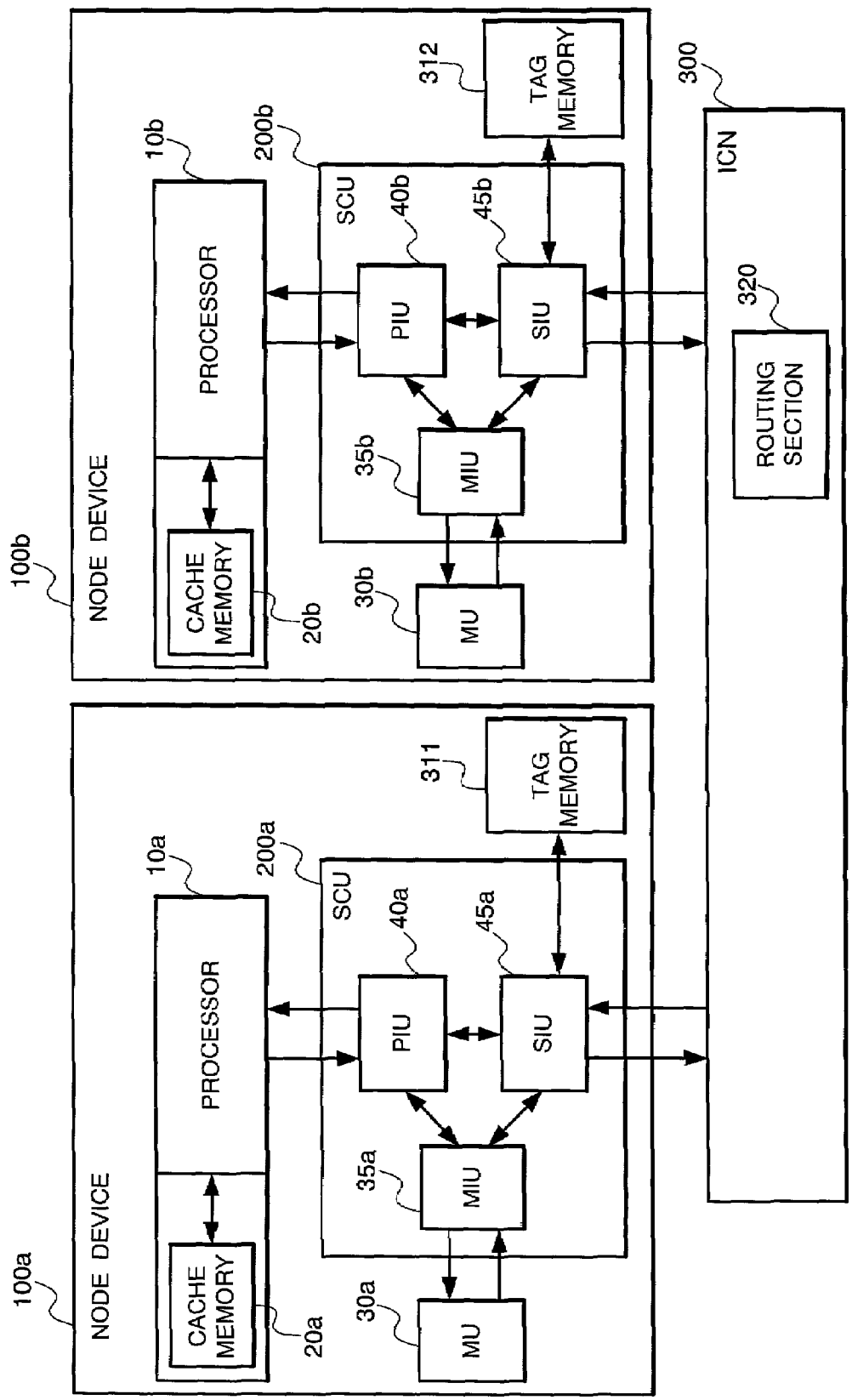
FIG. 19 is a block configuration diagram of a network system according to another embodiment of the present invention.

FIG. 19 is a block configuration diagram of a network system according to another embodiment of the present invention. In this embodiment, the tag memory 310 is not provided in the ICN 300, but divided and installed in the node devices 100a and 100b. Except this point, it has the same configuration as the embodiment shown in FIG. 1. As shown in FIG. 19, the node devices 100a and 100b are provided with tag memories 311 and 312 respectively. Total of the tag information from the tag memories 311 and 312 equals to the tag information in the tag memory 310 as described above.

Taking case (1) above as an example, the operation will be briefly described below. When the processor 10a issues a read type transaction, the PIU 40a has the SIU 45a execute the snoop processing and, at the same time, has the MIU 35a execute the speculative readout. The speculative readout is executed according to the route MIU 35a→MU 30a→MIU 35a→PIU 40a and the PIU obtains the data from the local memory (MU 30a) and waits for snooping. At this time, the LV bit and the TV bit of the control unit in the RDCB 410 are made active.

Figures 20, 21:
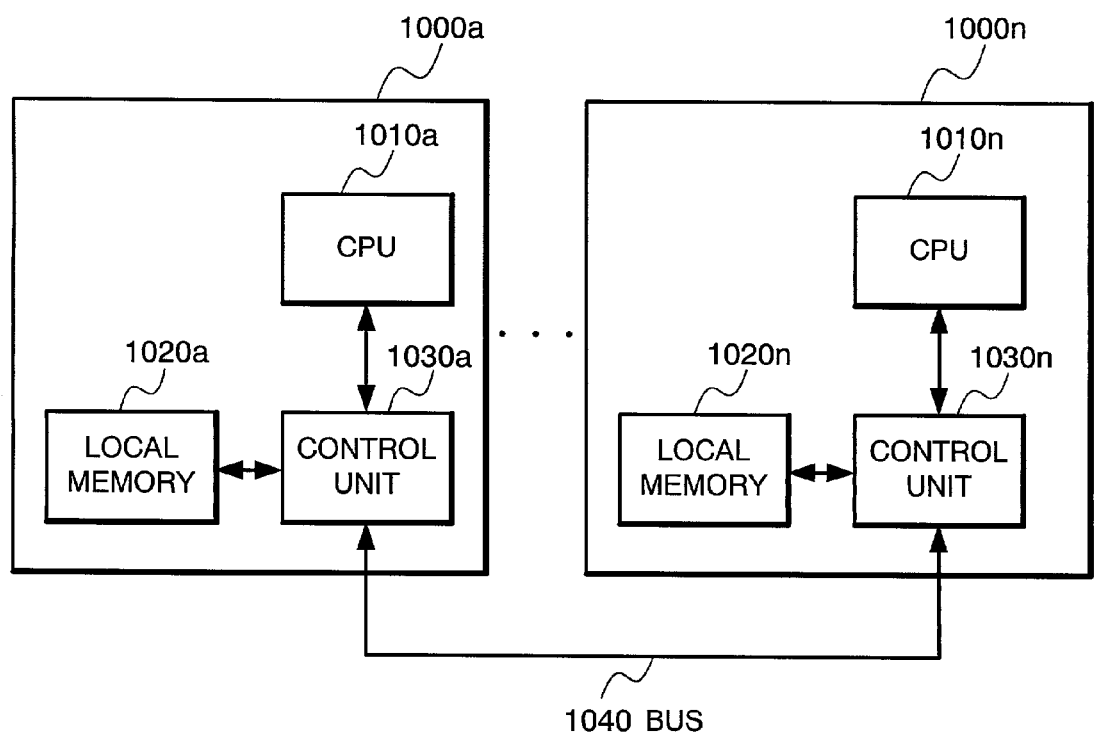
FIG. 20 is an explanatory view to explain the operation of the network system according to another embodiment of the present invention.
FIG. 21 is a block configuration diagram showing an example of the conventional NUMA system.
Figure 22:
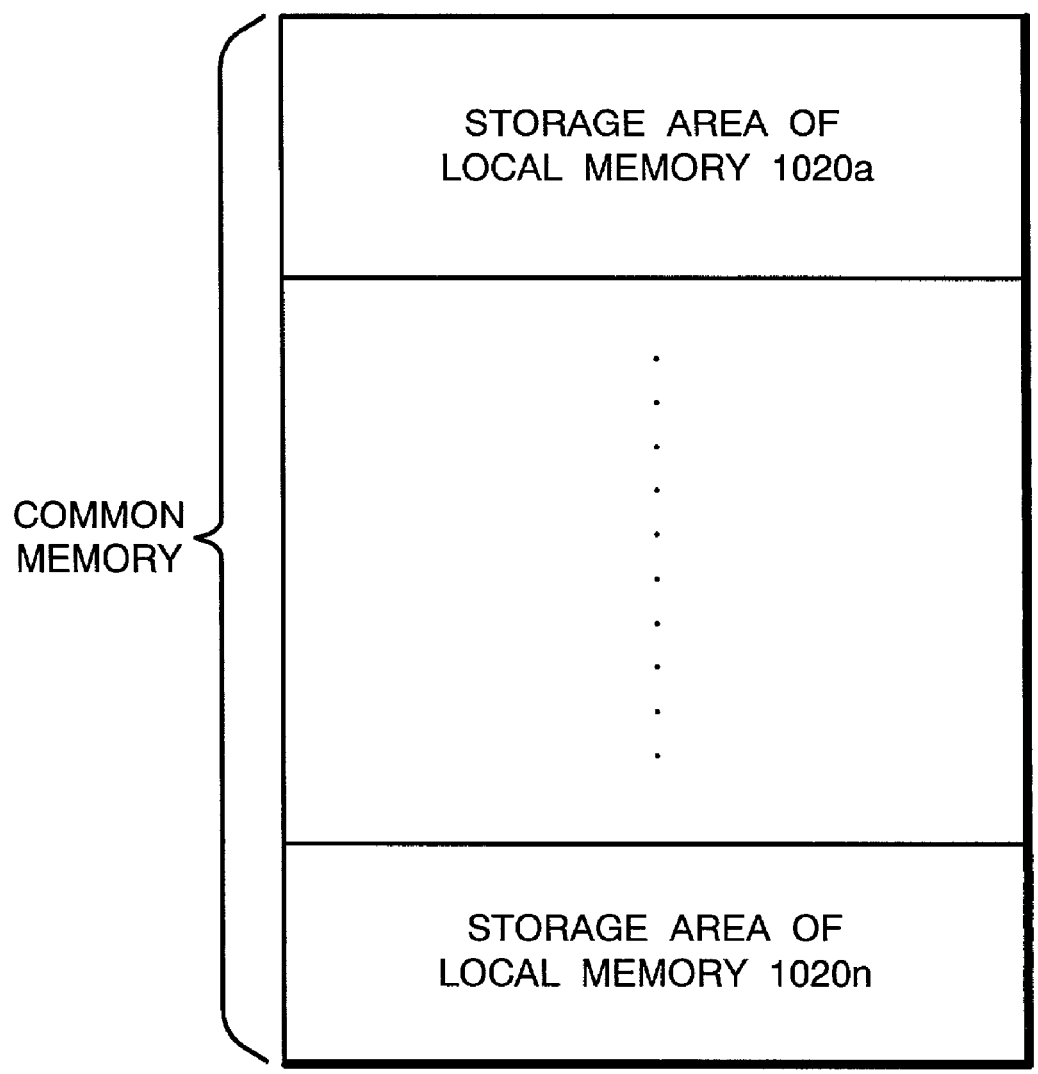
FIG. 22 is an explanatory view of the prior art as shown in FIG. 21.

On the other hand, the SIU 45a needs to execute snooping for two tag memories 311 and 312. When obtaining the status information of the tag memory 311, it sends the information for snoop processing execution to the ICN 300. In the processing to this point, the V bit of the SCB 450 is made active as shown in FIG. 20(a). Then, the information for snooping execution is sent to the SIU 45b of the node device 100b by the routing section 320 and the SIU 45b sends the snoop result of the tag memory 312 to the ICN 320. The routing section 320 sends it to the SIU 45a of the node device 100a.

Thus, at the time when the V bit becomes active as shown in FIG. 20(b), SNP1 as the information showing the snoop result of the tag memory 311 and SNP2 as the information showing the snoop result of the tag memory 312 are registered and the judgment section 460 sends the judgment result based on the information to the RDCB 410. Since the LV bit, TV bit and JV bit are registered to the bit memory 411, the V bit generator 412 makes the EV bit active. With the EV bit active, the reply mediation section 430 sends the corresponding entry in the RDB 420 to the processor 10a.

Supposing the case with the status information "U" where the same data as the data subjected to the speculative readout is not found in either of the cache memories 20a and 20b, the data obtained by the speculative readout earlier is sent to the processor 10a as the reply data.

As described above, even when the tag memory 310 is not collectively controlled but divided and distributed in the network system, a similar result is obtained: the latency can be reduced by the speculative readout. It is not necessary to install the tag memory 310 in the communication mechanism in this embodiment, and the configuration of the communication mechanism becomes simpler.

It will be preferable to save a data access program for execution of operations described above in a computer readable media so that the processor 10a (10b) can read it out and execute it for execution of the operations described above. The recording media may be ROM or other semiconductor recording media, FD, HD (hard disk) or other magnetic recording media or CD ROM, DVD ROM or other optical recording media. Of course, such an access program may be installed in a certain area of the local memory (MU 30a or 30b) achieved by the hard disk, for example, so that the processor 10a (10b) can execute it.

It is naturally understood that the above embodiments of the present invention can be modified in various ways: by installing three or more node devices, by providing two or more processors in each node device or by having a cache memory outside of the processor, for example.

As described so far, the present invention enables reduction of latency in accesses to the cache memories and local memories from the node device by executing the speculative readout.

Further, with a tag memory to store the tag information incorporated in the communication mechanism, the latency difference among nodes can be reduced.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data access method used in a network system having several node devices connected for communications configured so that each node device can execute certain processing by accessing memories in said several node devices or cache memories at a higher access speed, said method comprising:
   in each node device:
      executing a speculative access to said memories in the system while reading out, from a tag memory, a tag information as information related to a data storage status in said cache memories provided in the system, and
      deciding whether or not to abolish the data acquired from said memories by said speculative access according to said tag information read out,
   wherein said tag information indicates a data storage status comprising one of three possible states, including:
      1) data is not found in any of said node devices;
      2) data is found in more than one of said node devices; and
      3) data is found in only one node device;
   wherein said deciding whether or not to abolish the data acquired from said memories by said speculative access is based upon a logical combination of five bits of information defining a status of said speculative access, said five bits of information comprising:
      an "LV" bit that shows that reply data by a speculative read oath has been returned from a local memory;
      a "TV" bit that shows that a read type transaction has been received from a processor and issued;
      an "HV" bit that shows that reply data has been returned from a memory unit mounted on an other node;
      a "CV" bit that shows that modified data held in the cache of a remote node has been returned; and
      a "JV" bit that shows a snoop result being a "Modify found" bit that defines whether said data has been found to be currently in a cache memory in one of said node devices in said system, and
   wherein said cache data is abolished when one of said following conditions exist:
      LV=1, TV=1, HV=0, CV=1, and JV indicates "Modify found"; and
      LV=0, TV=1, HV=1, CV=1, and JV indicates "Modify found".

2. A data access method used in a network system having several node devices connected for mutual communications configured so that each node device can execute certain processing by reading out data from memories in said several node devices or cache memories at a higher access speed, said method comprising:
   in each node device:
      executing a speculative readout of data from said memories in the node devices while reading out, from a tag memory, a tag information as information related to a data storage status in said cache memories provided in the system,
      judging whether a same data as data subject to said speculative readout is in any of the cache memories based on said tag information read out,
      sending said speculative readout data to a processor in a self node device when the same data as the data subject to said speculative readout is not found in any of the cache memories, and
      acquiring, when the same data as the data subject to said speculative readout is in one of the cache memories, such data in said cache memory and sending said data to the processor in the self node device,
   wherein said tag information indicates a data storage status comprising one of three possible states, including:
      1) data is not found in any of said node devices;
      2) data is found in more than one of said node devices; and
      3) data is found in only one node device;
   wherein said deciding whether or not to abolish the data acquired from said memories by said speculative access is based upon a logical combination of five bits of information defining a status of said speculative access, said five bits of information comprising:
      an "LV" bit that shows that reply data by a speculative read nath has been returned from a local memory;
      a "TV" bit that shows that a read type transaction has been received from a processor and issued;
      an "HV" bit that shows that reply data has been returned from a memory unit mounted on an other node;

a "CV" bit that shows that modified data held in the cache of a remote node has been returned; and a "JV" bit that shows a snoop result being a "Modify found" bit that defines whether said data has been found to be currently in a cache memory in one of said node devices in said system, and wherein said cache data is abolished when one of said following conditions exist;

LV=1, TV=1, HV=0, CV=1, and JV indicates "Modify found"; and

LV=0, TV=1, HV=1, CV=1, and JV indicates "Modify found".

3. A data access method used in a network system as set forth in claim 2, wherein said speculative readout data is abolished when said data found in the cache memory is acquired and sent to the processor in the self node device.

4. A data access method used in a network system as set forth in claim 2, wherein each node device speculatively reads out the data from the memory in the self node device while reading out said tag information from the tag memory.

5. A data access method used in a network system as set forth in claim 2, wherein each node device speculatively reads out the data from the memory in the other node device while reading out said tag information from the tag memory.

6. A network system having several node devices connected for communications configured so that each node device can execute certain processing by accessing memories in said several node devices or cache memories at a higher access speed, each node device comprising:

access means for speculatively accessing said memories in the system while reading out, from a tag memory, a tag information as information related to data storage status in said cache memories provided in the system; and judgment means for judging whether or not to abolish data acquired from said memories by said speculative access according to said tag information read out, wherein said tag information indicates a data storage status comprising one of three possible states, including:

1) data is not found in any of said node devices;
2) data is found in more than one of said node devices; and
3) data is found in only one node device;

wherein said deciding whether or not to abolish the data acquired from said memories by said speculative access is based upon a logical combination of five bits of information defining a status of said speculative access, said five bits of information comprising:

an "LV" bit that shows that reply data by a speculative read path has been returned from a local memory;

a "TV" bit that shows that a read type transaction has been received from a processor and issued;

an "HV" bit that shows that reply data has been returned from a memory unit mounted on an other node;

a "CV" bit that shows that modified data held in the cache of a remote node has been returned; and a "JV" bit that shows a snoop result being a "Modify found" bit that defines whether said data has been found to be currently in a cache memory in one of said node devices in said system, and wherein said cache data is abolished when one of said following conditions exist:

LV=1, TV=1, HV=0, CV=1, and JV indicates "Modify found"; and

LV=0, TV=1, HV=1, CV=1, and JV indicates "Modify found".

7. A network system having several node devices connected by a communication mechanism for mutual communications configured so that each node device can execute certain processing by reading out data from memories in said several node devices or cache memories at a higher access speed, each node device comprising:

speculative readout means for executing a speculative readout of data from said memories in the node devices while reading out, from a tag memory, tag information as information related to a data storage status in said cache memories provided in the system;

judgment means for judging whether same data as data subject to said speculative readout is in any of the cache memories based on said tag information read out; and read data processing means which sends said speculative readout data to a processor in a self node device when same data as data subject to said speculative readout is judged not existing in any of the cache memories and, when the same data is judged existing in one of the cache memories, acquires such data in said cache memory and sends said data to the processor in the self node device, wherein said tag information indicates a data storage status comprising one of three possible states, including:

1) data is not found in any of said node devices;
2) data is found in more than one of said node devices; and
3) data is found in only one node device;

wherein said deciding whether or not to abolish the data acquired from said memories by said speculative access is based upon a logical combination of five bits of information defining a status of said speculative access, said five bits of information comprising:

an "LV" bit that shows that reply data by a speculative read path has been returned from a local memory;

a "TV" bit that shows that a read type transaction has been received from a processor and issued;

an "HV" bit that shows that reply data has been returned from a memory unit mounted on an other node;

a "CV" bit that shows that modified data held in the cache of a remote node has been returned; and a "JV" bit that shows a snoop result being a "Modify found" bit that defines whether said data has been found to be currently in a cache memory in one of said node devices in said system, and wherein said cache data is abolished when one of said following conditions exist:

LV=1, TV=1, HV=0, CV=1, and JV indicates "Modify found"; and

LV=0, TV=1, HV=1, CV=1, and JV indicates "Modify found".

8. A network system as set forth in claim 7, wherein said data processing means abolishes said speculative readout data when said data found in the cache memory is acquired and sent to the processor in the self node device.

9. A network system as set forth in claim 7, wherein said speculative readout means speculatively reads out data from a memory in the self node device.

10. A network system as set forth in claim 7, wherein said speculative readout means speculatively reads out data from a memory in another node device.

11. A network system as set forth in claim 7, wherein said tag memory is provided in said communication mechanism.

12. A computer readable memory storing a data access program for controlling the data access in a network system having several node devices connected for mutual communications configured so that each node device can execute certain processing by accessing memories in said several node devices or cache memories at a higher access speed, said data access program executing:

speculative access processing for the memories in the system while reading out, from a tag memory, tag information as information related to a data storage status in said cache memories provided in the system; and processing to judge whether or not to abolish data acquired from said memories by said speculative access according to said tag information read out, wherein said tag information indicates a data storage status comprising one of three possible states, including:
1) data is not found in any of said node devices;
2) data is found in more than one of said node devices; and
3) data is found in only one node device;

wherein said deciding whether or not to abolish the data acquired from said memories by said speculative access is based upon a logical combination of five bits of information defining a status of said speculative access, said five bits of information comprising:

an "LV" bit that shows that reply data by a speculative read path has been returned from a local memory;

a "TV" bit that shows that a read type transaction has been received from a processor and issued;

an "HV" bit that shows that reply data has been returned from a memory unit mounted on an other node;

a "CV" bit that shows that modified data held in the cache of a remote node has been returned; and a "JV" bit that shows a snoop result being a "Modify found" bit that defines whether said data has been found to be currently in a cache mem6rv in one of said node devices in said system, and wherein said cache data is abolished when one of said following conditions exist:
LV=1, TV=1, HV=0, CV=1, and JV indicates "Modify found"; and
LV=0, TV=1, HV=1, CV=1, and JV indicates "Modify found".

13. A computer readable memory storing a data access program for controlling the data access in a network system having several node devices connected for mutual communications configured so that each node device can execute certain processing by reading out data from memories in said several node devices or cache memories at a higher access speed, said data access program executing:

speculative readout processing to read out data from said memories in the node devices while reading out, from a tag memory, tag information as information related to a data storage status in said cache memories provided in the system;

judgment processing to judge whether same data as data subject to said speculative readout is found in any of the cache memories, based on said tag information read out;

processing, when the same data as the data subject to said speculative readout is not found in any of the cache memories, to send said speculative readout data to a processor in a self node device; and, processing, when the same data as the data subject to said speculative readout is found in one of the cache memories, to acquire such data in said cache memory and send said data to the processor in the self node device, wherein said tag information indicates a data storage status comprising one of three possible states, including:
1) data is not found in any of said node devices;
2) data is found in more than one of said node devices; and
3) data is found in only one node device;

wherein said deciding whether or not to abolish the data acquired from said memories by said speculative access is based upon a logical combination of five bits of information defining a status of said speculative access, said five bits of information comprising:

an "LV" bit that shows that reply data by a speculative read nath has been returned from a local memory;

a "TV" bit that shows that a read type transaction has been received from a processor and issued;

an "HV" bit that shows that reply data has been returned from a memory unit mounted on an other node;

a "CV" bit that shows that modified data held in the cache of a remote node has been returned; and a "JV" bit that shows a snoop result being a "Modify found" bit that defines whether said data has been found to be currently in a cache memory in one of said node devices in said system, and wherein said cache data is abolished when one of said following conditions exist:
LV=1, TV=1, HV=0, CV=1, and JV indicates "Modify found": and
LV=0, TV=1, HV=1, CV=1, and JV indicates "Modify found".

14. A computer readable memory storing a data access program for controlling data access in a network system as set forth in claim 13, wherein said data access program abolishes said: speculative readout data when acquiring the data in said cache memory and sends such data to the processor in the self node device.

15. A computer readable memory storing a data access program for controlling the data access in a network system as set forth in claim 13, wherein said data access program speculatively reads out data from memories in the self node device while reading out said tag information from the tag memory.

16. A computer readable memory storing a data access program for controlling the data access in a network system as set forth in claim 13, wherein said data access program speculatively reads out data from memories in another node device while reading out said tag information from the tag memory.

* * * * *